(12) United States Patent
Willems

(10) Patent No.: US 8,573,604 B2
(45) Date of Patent: Nov. 5, 2013

(54) WHEEL SUSPENSION FOR A MOTOR VEHICLE

(75) Inventor: Marco Willems, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/818,029

(22) PCT Filed: Jul. 20, 2011

(86) PCT No.: PCT/EP2011/003626
§ 371 (c)(1),
(2), (4) Date: Feb. 20, 2013

(87) PCT Pub. No.: WO2012/025176
PCT Pub. Date: Mar. 1, 2012

(65) Prior Publication Data
US 2013/0154277 A1    Jun. 20, 2013

(30) Foreign Application Priority Data
Aug. 21, 2010 (DE) .......................... 10 2010 035 088

(51) Int. Cl.
*B60G 13/14* (2006.01)
*B60G 17/06* (2006.01)

(52) U.S. Cl.
USPC ........................... 280/5.5; 280/5.515; 180/165

(58) Field of Classification Search
CPC .............. B60G 13/14; B60G 17/0157; B60G 2202/42; B60G 2202/422; B60G 2204/4192; B60G 2300/60
USPC ................ 280/5.5, 5.507, 5.508, 5.509, 5.51, 280/5.513, 5.515, 5.519; 180/165; 310/20, 310/90; 322/3; 188/266
See application file for complete search history.

(56) References Cited

U.S. PATENT DOCUMENTS

| 5,060,959 | A | * | 10/1991 | Davis et al. ............... 280/5.514 |
| 5,186,486 | A | * | 2/1993 | Hynds et al. ........... 280/124.107 |
| 5,432,382 | A | * | 7/1995 | Pawlowski ..................... 290/1 R |
| 8,042,818 | B2 | * | 10/2011 | Yamawaki et al. ........ 280/5.515 |
| 2007/0252452 | A1 | * | 11/2007 | Ishimoto et al. ............. 310/67 A |
| 2009/0224502 | A1 | * | 9/2009 | Yamawaki et al. ..... 280/124.108 |
| 2009/0273147 | A1 | * | 11/2009 | Inoue et al. ................. 280/5.51 |
| 2010/0117277 | A1 | * | 5/2010 | Ohta et al. ............... 267/140.14 |
| 2010/0207309 | A1 | * | 8/2010 | Park ............................. 267/195 |

FOREIGN PATENT DOCUMENTS

| DE | 39 25 812 | | 3/1990 |
| DE | 101 15 858 | | 10/2002 |
| DE | 102010008009 | | 11/2010 |
| EP | 1 296 440 | | 3/2003 |
| EP | 1405784 A1 | * | 4/2004 |
| EP | 1 582 383 | | 10/2005 |
| EP | 2 098 390 | | 9/2009 |
| JP | 2001-55033 | | 2/2001 |
| JP | 2005256921 A | * | 9/2005 |
| WO | WO 01/67584 | | 9/2001 |

* cited by examiner

Primary Examiner — Joseph Rocca
(74) Attorney, Agent, or Firm — Henry M Feiereisen LLC

(57) ABSTRACT

A wheel suspension for a motor vehicle includes an electric vibration damper which is affixed to the vehicle body and which has a generator that can be driven by translational wheel movements of the vehicle wheel in order to generate an induced voltage. The stator and the rotor of the generator are interconnected via at least one gear stage, wherein a gear element of the gear stage is a drive gear wheel of a rack-and-pinion drive that is drivingly connected to a wheel carrier of the wheel suspension, with the wheel carrier following the wheel movements.

18 Claims, 4 Drawing Sheets

WHEEL SUSPENSION FOR A MOTOR VEHICLE

CROSS-REFERENCES TO RELATED APPLICATIONS

This application is the U.S. National Stage of International Application No. PCT/EP2011/003626, filed Jul. 20, 2011, which designated the United States and has been published as International Publication No. WO 2012/025176 and which claims the priority of German Patent Application, Serial No. 10 2010 035 088.5, filed Aug. 21, 2010, pursuant to 35 U.S.C. 119(a)-(d).

BACKGROUND OF THE INVENTION

The invention relates to a wheel suspension for a motor vehicle.

The wheel suspension of a motor vehicle may have an electric shock absorber, which attenuates the operational vehicle vibrations. The electric shock absorber may include a generator which converts the vibration energy into electrical energy that can be supplied via corresponding power electronics to the onboard electrical system of the vehicle.

DE 101 15 858 A1 discloses an electric vibration damper of this type with a generator driven by the operational up and down movements of the vehicle wheel, thereby generating an induced voltage.

For driving the generator disclosed in DE 101 15 858 A1, a ball screw drive is provided which includes a threaded nut cooperating with a threaded spindle and being associated in fixed rotational engagement with the lower spring plate of a suspension spring. The threaded spindle in turn drives a rotor shaft of the generator to generate an induced voltage. Alternatively, the ball screw can also be constructed as a rack-and-pinion gear.

The generator of the electric damper disclosed in DE 101 15 858 A1 is seated on an upper supporting spring plate which is pivotally mounted on the vehicle body at a pivot point. Moreover, the generator is arranged inside the suspension spring. As a result, the installation space available for the generator is greatly reduced. Moreover, the resultant rotational movement of the rotor operating in the generator is small under normal driving operation, so that the generator can operate only with a reduced overall efficiency.

SUMMARY OF THE INVENTION

It is an object of the invention to provide a wheel suspension with an electric vibration damper with a generator constructed to efficiently induce a voltage during driving operation.

According to an aspect of the invention, a wheel suspension for a motor vehicle includes an electric vibration damper having a generator attached on the vehicle body, wherein the generator can be driven by translational wheel movements of the vehicle wheel for generating an induced voltage; the stator and the rotor of the generator are interconnected via at least one gear stage. According to the invention, not only the rotor, but additionally also the stator of the generator, are therefore part of the transmission stage. This configuration results in a different operating principle compared to the aforementioned prior art, wherein the stator is not a fixed component, but instead is actively rotated during the actual damping process. The rotational movement of the stator can be transmitted to the rotor via the gear stage. With appropriate gear ratios, the rotor can be rotated at much higher rotational speeds than the stator. This significantly increases the induced voltage generated in the generator.

Moreover, according to the invention, a drive gear of a rack-and-pinion drive is another part of the gear stage in addition to the stator and the rotor. The rack-and-pinion drive is in turn drivingly connected with a wheel carrier of the wheel suspension that follows the translational wheel movements. The resultant translational up and down movement of the wheel carrier can be directly converted by a toothed rack of the rack-and-pinion drive into a rotation of the rotor or the stator via the drive gear integrated in the gear stage. The installation space required for this drive connection is much more compact than the installation space for a lever arrangement having a lever arm converting translatory wheel movements into a rotation of the rotor.

In view of the limited installation space, the generator of the electric vibration damper may advantageously not be arranged directly in the region of the wheel carrier, but spaced therefrom. Against this background, the rack of the rack-and-pinion drive may be a wheel guide element extending between the wheel carrier and the vehicle body. The wheel guide element may have a rack portion at its end distal from the wheel carrier which is in tooth-meshing engagement with the aforementioned drive gear wheel.

To further reduce the installation space, the rack-and-pinion drive may be directly integrated at a pivot point of the wheel guide element on the vehicle structure. In this case, the wheel guide element and the meshing drive gear wheel of the generator can be regarded as a cooperating joint members, in particular at the end of the wheel guide element distal from the wheel carrier. For a space-saving design of the pivot point, the rotation axis of the rotor and the stator may be identical to a pivot axis of the pivot point. A wheel guide element within the context of the invention is to be understood as control arms which connect in a conventional manner the wheel carrier with the vehicle body, such as transverse control arms, trailing control arms or semi-trailing control arms. For a smooth transfer of the translational up/down movement of the vehicle wheel during the drive movement of the wheel guide element, the wheel guide element is advantageously articulated on the wheel carrier via a pivot bearing. Different angular positions between the wheel carrier and the wheel guide element can thereby be compensated.

To further reduce the installation space, the drive gear wheel of the rack-and-pinion drive may directly or indirectly drive the rotor and/or the stator of the generator of the electric vibration damper. Preferably, the drive gear wheel is seated in form of a ring gear in fixed rotational engagement on a rotor shaft or outside the stator.

In a particularly compact design of the electric vibration damper, the at least one gear stage interconnected between the stator and the rotor may be a planetary gear having a much reduced overall length compared to other types of gears. To further reduce the installation space, the stator of the generator together with the radially outer ring gear of the planetary gear of the gear stage may be constructed as a one-piece assembly. The ring gear can therefore operate as an input element of the gear stage. The output element of this gear stage may preferably be the radially inner sun gear.

Depending on desired gear ratio between stator and rotor, the radially inner sun gear may drive the rotor directly or may be connected in fixed rotational engagement with an input element of a second gear stage. The second gear stage may also be constructed as a planetary gear and may be used to introduce the drive torque into the rotor with an appropriate gear ratio. The planet carrier of the first gear stage may be supported in fixed rotational engagement on the vehicle body and thus serve as a torque support.

In the event that the second transmission stage is additionally provided, the ring gear of the planetary gear of the second gear stage may be connected in fixed rotational engagement with the vehicle body as a torque support. Conversely, the sun gear of the second gear stage may be connected as an output element to the rotor shaft of the generator.

In an alternative embodiment, the drive gear wheel of the rack-and-pinion drive may be seated in fixed rotational engagement directly on the rotor shaft of the generator. The rack may also be constructed with a first toothing and a second toothing on both sides. The first toothing may mesh directly with the drive gear wheel seated on the rotor shaft. Conversely, the second toothing of the rack may be drivingly connected to the stator via a gear stage.

BRIEF DESCRIPTION OF THE DRAWING

Two exemplary embodiments of the invention will now be described with reference to the appended figures.

These show in.

DETAILED DESCRIPTION OF PREFERRED EMBODIMENTS

Figure 1:
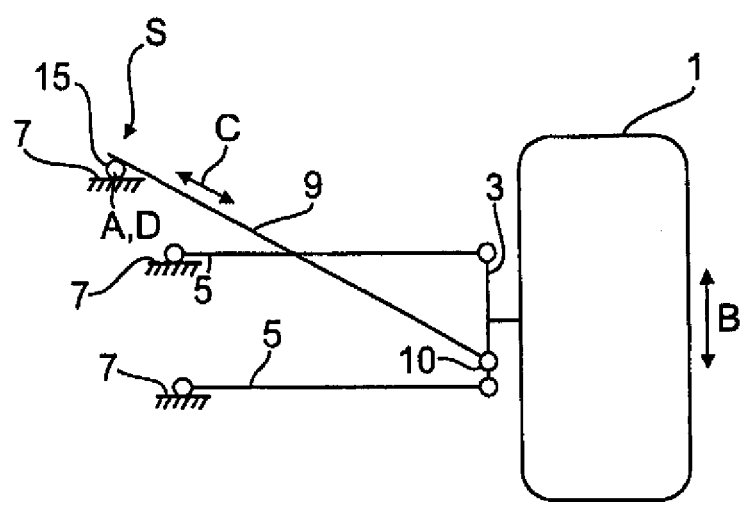
FIG. 1 a schematic diagram of a wheel suspension of a vehicle wheel.

FIG. 1 shows the wheel suspension of a vehicle wheel of a motor vehicle 1. The vehicle wheel 1 is rotatably mounted on a wheel carrier 3. The wheel carrier 3 is articulated on the vehicle body 7 via transverse control arms 5. In addition, the wheel carrier 3 is connected with the vehicle body 7 at a pivot point S via a semi-trailing control arm 9, particularly for pivoting about a pivot axis D. As further shown in the FIG. 1, the semi-trailing control arm 9 is coupled to the wheel carrier 3 via a pivot bearing 10. This construction enables a smooth transfer of the translatory up and down movements B toward the electric vibration damper 16.

Figure 2:
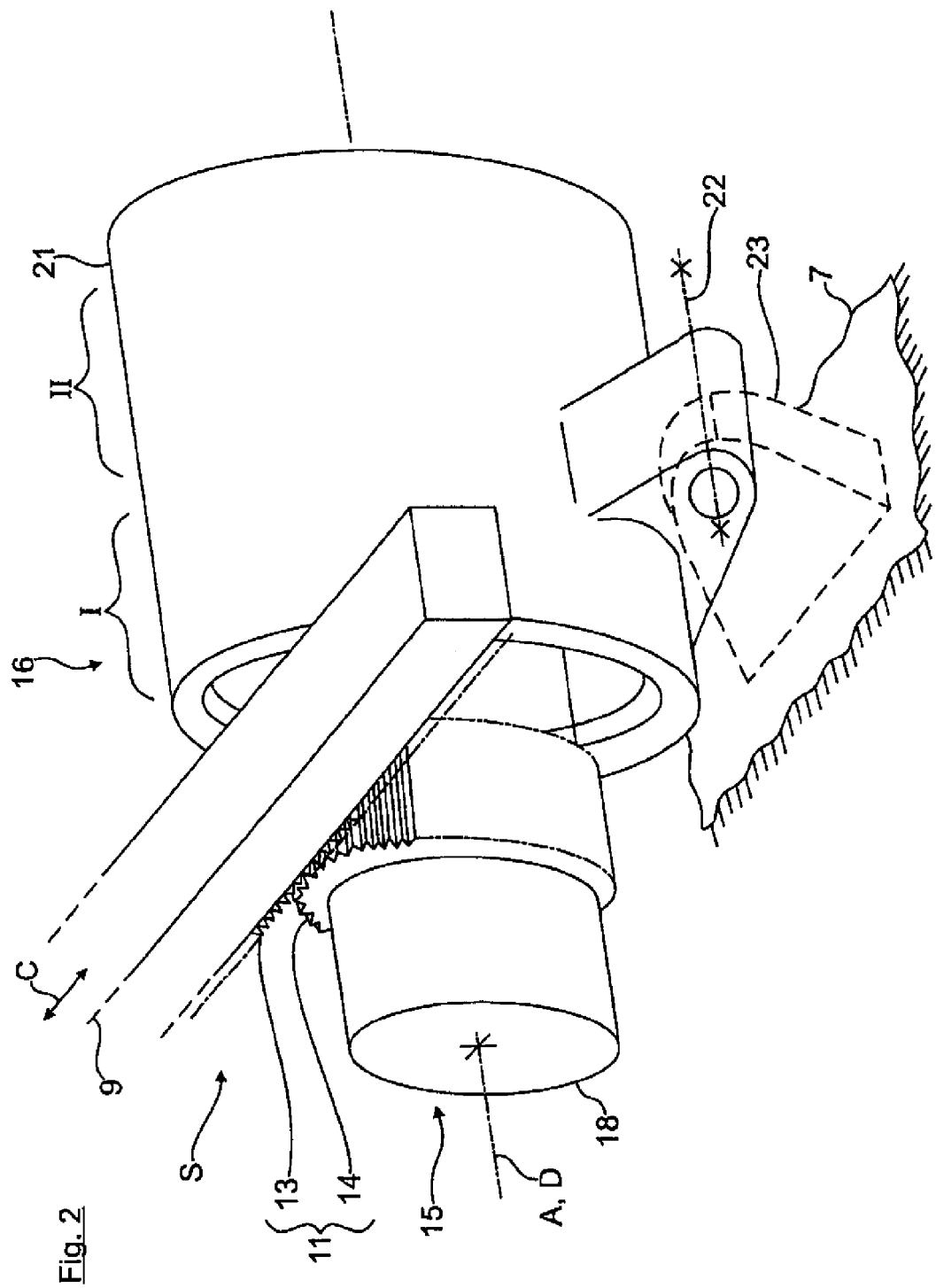
FIG. 2 a pivot point of a wheel guide element of the wheel suspension on the vehicle body.

FIG. 2 shows on an enlarged scale the pivot point S between the semi-trailing control arm 9 and the vehicle body 7. The semi-trailing control arm 9 is articulated via a rack-and-pinion gear 11, as shown in FIG. 2. The rack-and-pinion gear 11 has as a cooperating gear member a rack portion 13 which is integrally formed on the end of the semi-trailing control arm 9 distal from the wheel carrier. The rack section 13 meshes with a drive sprocket 14 of a generator 15, which is part of an electric damper 16.

Figure 3:
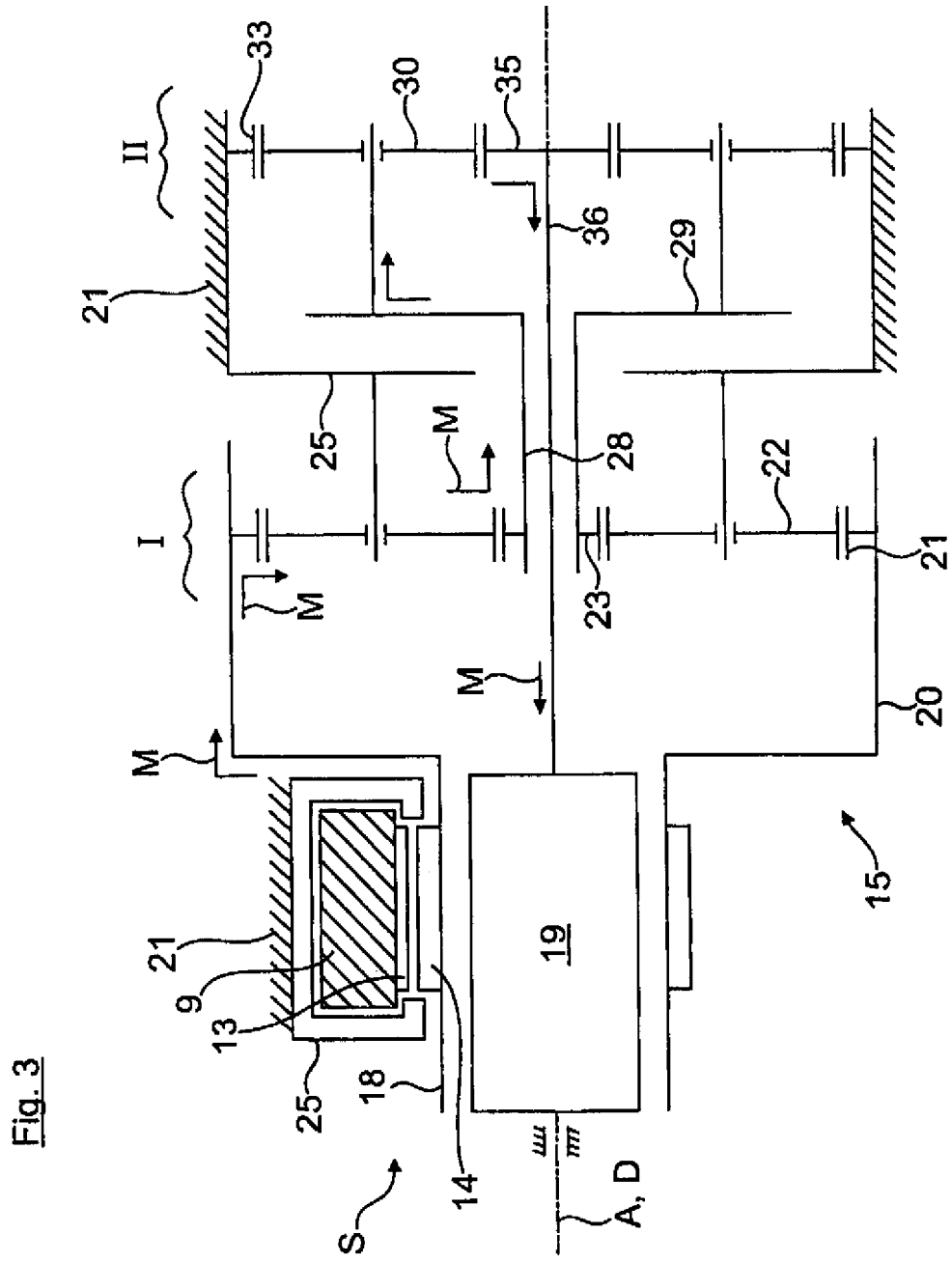
FIG. 3 a schematic cross-sectional side view of the electric damper fastened to the vehicle body.

The generator 15 may, for example, be an inner-pole generator having a radially outer stator 18 and a cooperating rotor 19, as shown in FIG. 3. The stator 18 which is constructed approximately as a hollow cylinder has on its inner side unillustrated induction windings, which cooperate with likewise not illustrated electromagnets of the rotor. Alternatively, the induction windings may also be seated on the rotor and the field magnets may be seated on the stator. The ring gear 14 of the rack-and-pinion drive 11 is arranged in fixed rotational engagement on the outer periphery of the stator 18, as shown in FIGS. 2 and 3.

As also shown in FIG. 2, the generator 15 protrudes into a damper housing 21 of the electric damper 16. The damper housing 21 is coupled in fixed rotational engagement by screw connections 22 to retaining brackets 23 of the vehicle body 7, as shown in FIG. 2, of which only one is indicated in FIG. 2 by dashed lines. Two gear stages I, II, which drivingly connect the stator 18 to the rotor 19 of generator 15, are arranged in the damper housing 21. The gear stages I and II are shown in more detail in FIG. 3. According to the FIG. 3, the stator 18 is extended toward the right edge of the image by a ring gear 20 facing to the right. The ring gear 20 which has a larger-diameter than the stator 18 is connected in the axial direction to the stator 18 by way of a shoulder and forms a torque input element of the gear stage I constructed as a planetary gear. For a compact design, the pivot axis D of the pivot point S is identical to the rotation axis A of the stator 18 and the rotor 19, respectively.

In the gear stage I constructed as a planetary gear, the inner toothing 21 of the ring gear 20 meshes with planetary gears 22. These in turn mesh with a sun gear 23, which is arranged coaxially with the rotation axis A of the rotor 19. The planetary gears 22 of the first gear stage I are in FIG. 3 rotatably mounted on a planetary gear carrier 25. This planetary gear carrier 25 is formed in fixed rotational engagement on the damper housing 21, which is mounted on the aforementioned retaining brackets 23 on the vehicle body 7.

The sun gear 23 of the first gear stage I in FIG. 3 is supported by a hollow shaft 28, with a planetary wheel carrier 29 of the second gear stage II being formed on the right end face of the hollow shaft 28, as shown in FIG. 3. The second gear stage II is, like the first gear stage I, constructed as a planetary gear, wherein the planetary gears 30 mesh radially outwardly with an inner toothing 33 of the damper housing 21 that is fixed mounted on the vehicle body 7. The sun gear 25 of the second gear stage II meshing with the planetary gears 30 forms the gear output element. The sun gear 35 is also drivingly connected with the rotor 19 of the generator 15 via a drive shaft 36 that coaxially passes through the hollow shaft 28.

As further shown in the FIG. 3, the pivot point S distal from the wheel carrier is formed by the rack portion 13 of the semi-trailing control arm 9 and by the ring gear 14 of the rack-and-pinion drive 11. The transverse control arm 9 is here guided for longitudinal displacement in a schematically indicated guide rail 25 having a rectangular profile. The guide rail 25 is mounted on the damper housing 21, as shown for example in FIG. 3. The guide rail 25 has been omitted in FIG. 2 for sake of clarity.

During the driving operation, the wheel carrier 3 and/or the vehicle wheel 1 rotatably supported thereon is subjected to translational up and down movements B. These wheel movements B are introduced into the electric vibration damper 16 via the semi-trailing control arm 9 as likewise translational drive movements C, as is indicated in FIG. 2. The drive torques introduced into the stator 18 via the rack portion 13 are transmitted to the first gear stage I via the ring gear 20 in a torque flow direction M shown in FIG. 3. The drive torques are transmitted by the planetary wheel carrier 29 to the second transmission stage II via the sun gear 23 operating as an output element of the first gear stage I. The gear ratios of the two gear stages I, II are dimensioned so that a rotor rotation speed suitable for effective voltage induction is attained even with small or long-wavelength wheel movements B.

Figure 4:
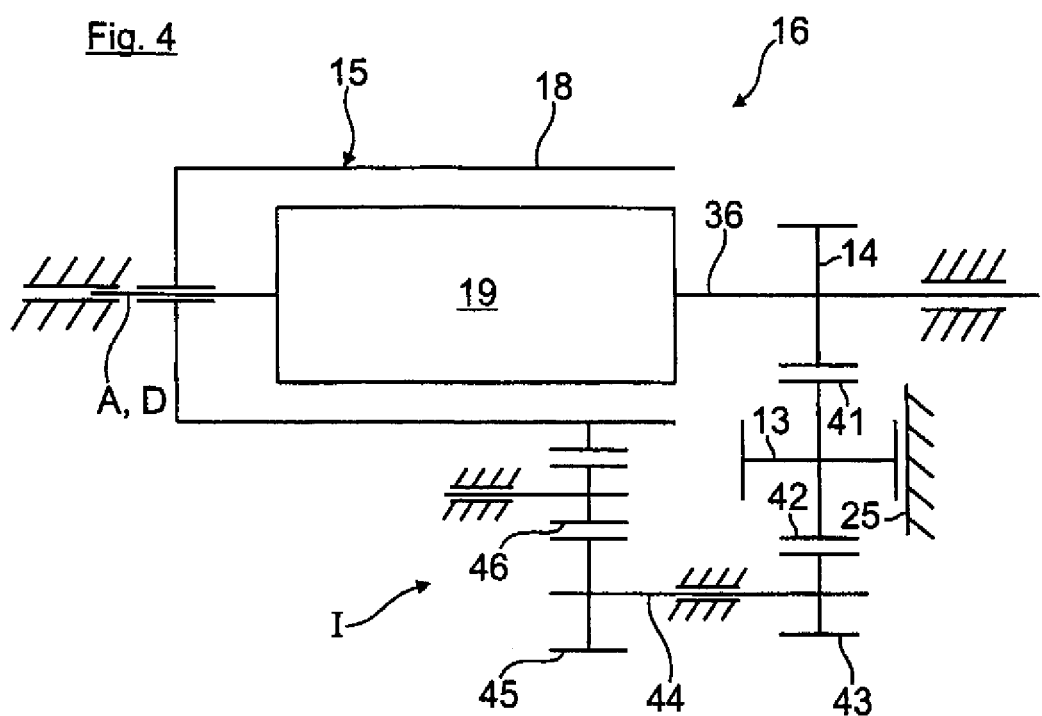
FIG. 4 the second embodiment in a view corresponding to FIG. 3.

FIG. 4 shows a second embodiment of the invention, wherein the rotor 19 is also drivingly connected to the stator 18 via a gear stage I. Like in the first embodiment, the drive gear wheel 14 of a rack-and-pinion drive 11 is part of this gear stage I. The drive gear wheel 14 is also driven by a rack portion 13 of the semi-trailing control arm 9.

In contrast to the first embodiment, the drive gear wheel 14 of the rack-and-pinion drive is seated not on the stator 18, but in fixed rotational engagement on the rotor shaft 36. The rack portion 13 of the semi-trailing control arm 9 is also constructed with a first toothing 41 and an opposing second toothing 42 on both sides. The first toothing 41 meshes according to the FIG. 4 with the drive gear wheel 14, whereas the second toothing 42 meshes with a pinion 43.

The pinion 43 is connected via an intermediate shaft 44 with a spur gear 45. The spur gear 45 of the gear stage I is in turn in meshing engagement with the stator 18 via an intermediate gear 46. This ensures that the stator 18 and the rotor 19 rotate relative to each other in opposite directions. Such an intermediate gear stage can optionally also be used in the first embodiment for potentially increasing a relative rotation speed between the rotor 19 and the stator 18.

What is claimed is:

1. A wheel suspension for a motor vehicle, comprising:
   an electric vibration damper having a generator attached on a vehicle body of the motor vehicle and comprising a stator and a rotor, wherein the generator is driven by translational wheel movements of a vehicle wheel for generating an induced voltage, and
   at least one gear stage interconnecting the stator and the rotor, with the at least one gear stage comprising a gear element constructed as a drive gear wheel of a rack-and-pinion drive, wherein the rack-and-pinion drive is drivingly connected with a wheel carrier of the wheel suspension, with the wheel carrier following the translational wheel movements.

2. The wheel suspension of claim 1, wherein the rack-and-pinion drive comprises a wheel guide element extending between the wheel carrier and the vehicle body, wherein the wheel guide element is in meshing engagement with the drive gear by way of a rack portion of the rack-and-pinion drive.

3. The wheel suspension of claim 2, wherein the wheel guide element comprises a control arm selected from a transverse control arm and a longitudinal control arm.

4. The wheel suspension of claim 2, wherein the rack-and-pinion drive forms a pivot point between the wheel guide element and the vehicle body.

5. The wheel suspension of claim 4, wherein the pivot point is formed at an end of the wheel guide element distal from the wheel carrier.

6. The wheel suspension of claim 4, further comprising a pivot bearing pivotally connecting the wheel guide element to the wheel carrier.

7. The wheel suspension of claim 2, wherein the drive gear wheel of the rack-and-pinion drive is seated on the stator in fixed rotational engagement.

8. The wheel suspension of claim 2, wherein the at least one gear stage is constructed as a planetary gear.

9. The wheel suspension of claim 8, wherein a first of the at least one gear stage comprises a radially outer ring gear constructed as a one-piece unit with the stator of the generator.

10. The wheel suspension of claim 8, wherein a first of the at least one gear stage comprises a radially outer ring gear operating as an input element of the first gear stage and constructed to introduce drive torques into the first gear stage.

11. The wheel suspension of claim 8, wherein the planetary gear comprises a radially inner sun gear operating as an output element, which is seated in fixed rotational engagement on a rotor shaft or is connected in fixed rotational engagement to an input element of a second gear stage of the at least one gear stage.

12. The wheel suspension of claim 11, wherein the sun gear of a first of the at least one gear stage is connected in fixed rotational engagement with a planetary gear carrier of the second gear stage operating as the input element.

13. The wheel suspension of claim 12, wherein a ring gear of the planetary gear of the second gear stage is supported in fixed rotational engagement on the vehicle body.

14. The wheel suspension of claim 13, wherein a sun gear of the planetary gear of the second gear stage operates as an output element that is connected to a rotor shaft of the generator.

15. The wheel suspension of claim 8, wherein a first of the at least one gear stage comprises a planetary gear carrier which is supported in fixed rotational engagement on the vehicle body.

16. The wheel suspension of claim 1, wherein the drive gear wheel of the rack-and-pinion drive is seated on a rotor shaft of the generator in fixed rotational engagement.

17. The wheel suspension of claim 16, wherein a rack portion of the rack-and-pinion drive comprises a first toothing and a second toothing arranged on opposite sides of the rack portion.

18. The wheel suspension of claim 17, wherein the first toothing drives a first drive gear wheel seated on the rotor shaft and the second toothing drives a second drive gear wheel seated on the stator.

* * * * *